United States Patent
Alshinnawi et al.

(10) Patent No.: US 10,334,063 B2
(45) Date of Patent: Jun. 25, 2019

(54) SYSTEMS, COMPUTING DEVICES, AND METHODS FOR SETTING DATA USAGE LEVELS AMONG COMPUTING DEVICES BASED ON PREDICTED DATA USAGE

(71) Applicant: Lenovo Enterprise Solutions (Singapore) Pte. Ltd., New Tech Park (SG)

(72) Inventors: Shareef F. Alshinnawi, Apex, NC (US); Gary D. Cudak, Wake Forest, NC (US); Joseph F. Herman, Raleigh, NC (US); John M. Weber, Wake Forest, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 135 days.

(21) Appl. No.: 15/334,757

(22) Filed: Oct. 26, 2016

(65) Prior Publication Data

US 2018/0115976 A1    Apr. 26, 2018

(51) Int. Cl.
*H04M 15/00*    (2006.01)
*H04L 29/08*    (2006.01)
*G06Q 10/06*    (2012.01)
*H04L 12/14*    (2006.01)

(52) U.S. Cl.
CPC .............. *H04L 67/22* (2013.01); *G06Q 10/06* (2013.01); *H04L 12/14* (2013.01); *H04M 15/00* (2013.01); *H04M 15/41* (2013.01); *H04M 15/58* (2013.01); *H04M 15/8214* (2013.01)

(58) Field of Classification Search
CPC . H04W 72/0486; H04L 67/22; H04L 43/0876
See application file for complete search history.

(56) References Cited

U.S. PATENT DOCUMENTS

| | | | |
|---|---|---|---|
| 9,635,188 B1* | 4/2017 | Bradley | H04M 15/60 |
| 9,655,114 B1* | 5/2017 | Reynolds | H04L 41/0896 |
| 9,887,894 B2* | 2/2018 | Zalmanovitch | H04L 43/045 |
| 2010/0017506 A1* | 1/2010 | Fadell | H04M 15/00 709/224 |
| 2013/0196615 A1* | 8/2013 | Zalmanovitch | H04L 43/045 455/405 |
| 2017/0237621 A1* | 8/2017 | Reynolds | H04L 41/0896 455/406 |
| 2017/0325141 A1* | 11/2017 | Laliberte | H04W 12/06 |

* cited by examiner

*Primary Examiner* — Hashim S Bhatti
(74) *Attorney, Agent, or Firm* — Olive Law Group, PLLC

(57) ABSTRACT

Systems, computing devices, and methods for setting data usage levels among computing devices based on predicted data usage are disclosed. According to an aspect, a method includes predicting data usage by a computing device. The computing device is associated with a data usage plan including the computing device and at least one other computing device. The method also includes setting a data usage level of the at least one other computing device based on the predicted data usage.

20 Claims, 2 Drawing Sheets

SYSTEMS, COMPUTING DEVICES, AND METHODS FOR SETTING DATA USAGE LEVELS AMONG COMPUTING DEVICES BASED ON PREDICTED DATA USAGE

TECHNICAL FIELD

The present subject matter relates to computing device communications. More specifically, the present subject matter relates to systems, computing devices, and methods for setting data usage levels among computing devices based on predicted data usage.

BACKGROUND

The Mobile computing devices, such as smartphones and tablet computers, have become ubiquitous and their use continues to increase. Along with the increased popularity, there has been a similar increase in the amount of data handled by networks of service providers. Mobile computing device users typically pay based on how much data that is communicated via the networks.

Services providers offer various plans for users on an account. For example, a family may share a data usage plan in which they are allocated a particular amount of data per month as an aggregate value for all of the users on the account. Currently, it is possible to set hard limits on a user's device or on their account to manager going over the total aggregate limit on the account. These hard limits are typically conservative, causing users to throttle behavior or lose function. Often, a fair amount of unused data allocation remains at the end of a use period.

For at least these reasons, there is a need for improved techniques for users to manage their data usage plans so that their data allocation is used more efficiently.

SUMMARY

Disclosed herein are systems, computing devices, and methods for setting data usage levels among computing devices based on predicted data usage. According to an aspect, a method includes predicting data usage by a computing device. The computing device is associated with a data usage plan including the computing device and at least one other computing device. The method also includes setting a data usage level of the at least one other computing device based on the predicted data usage.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
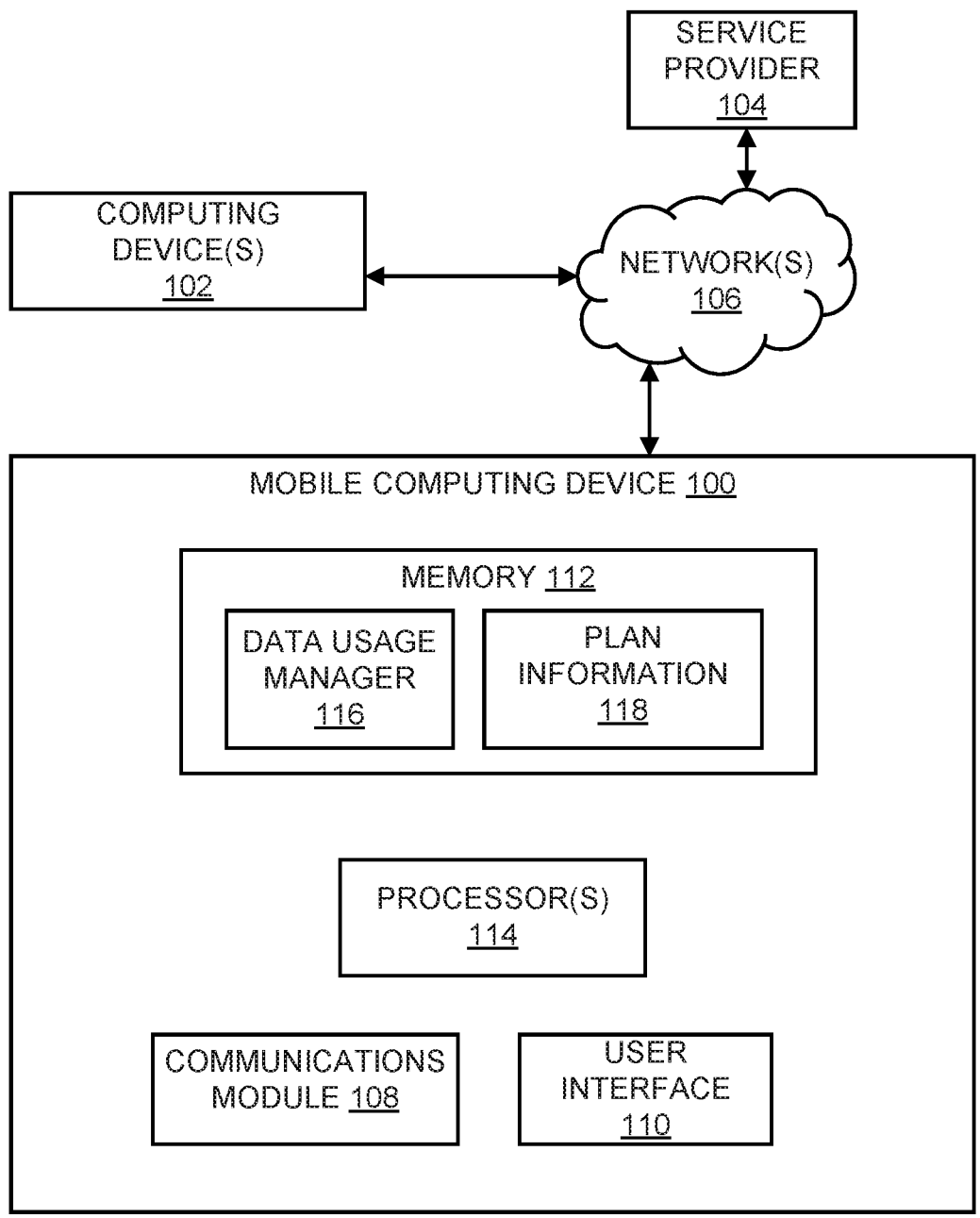
FIG. 1 is a block diagram of an example system including a mobile computing device 100 for setting data usage levels among computing devices based on predicted data usage in accordance with embodiments of the present disclosure.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the computing device and achieve the stated purpose of the computing device.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, ROM and RAM.

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the term "computing device" should be broadly construed. It can include any type of computing device, for example, a smart phone, a cell phone, a pager, a personal digital assistant (PDA, e.g., with GPRS NIC), a mobile computer with a smartphone client, or the like. A computing device can also include any type of conventional computer, for example, a desktop computer or a laptop computer. A typical mobile device is a wireless data access-enabled device (e.g., an iPHONE® smartphone, a BLACKBERRY® smart phone, a NEXUS ONE™ smart phone, an iPAD™ device, or the like) that is capable of sending and receiving data in a wireless manner using communications protocols such as the Internet Protocol (IP), BLUETOOTH®, WI-FI®, and the wireless application protocol (WAP). This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

As referred to herein, a "user interface" is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object. Operating environments in which embodiments of the presently disclosed subject matter may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the presently disclosed subject matter may be implemented in other and next-generation mobile networks and devices as well. The mobile device is the physical equipment used by the end user, typically a subscriber to the wireless network. Typically, a mobile device is a 2.5G-compliant device or 3G-compliant device (or the proposed 4G-compliant device) that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The mobile device may also include a memory or data store.

The present disclosure is now described in more detail. For example, FIG. 1 illustrates a block diagram of an example system including a mobile computing device 100 for setting data usage levels among computing devices based on predicted data usage in accordance with embodiments of the present disclosure. In this example, the mobile computing device 100 is associated with a data usage plan including the mobile computing device 100 and one or more other computing devices 102. For example, computing device 100 and computing device(s) 102 may each be associated with a user who are all members of the same family or other type of group. The family or group may share a data usage plan administered by a service provider 104. The computing device 100 and computing device(s) 102 may communicate data among one another and other computing types via one or more networks 106 as administered by the service provider 104. Example data can include, but is not limited to, phone data, email, text messages, video, image files, and the like.

Computing devices(s) 102 may include components and functionality similar to computing device 100. The computing device 100 may include a communications module 108 configured to communicate data to other computing devices via the network(s) 106, and to receive data from other computing devices via the network(s) 106. The computing device 100 may also include a user interface 110 including components such as a touchscreen display, one or more speakers, buttons, and the like. Further, the computing device 100 may include hardware, software, firmware, and combinations thereof for implementing functionality described herein. For example, the computing device 100 may include a memory 112 and one or more processors 114 configured to implement the functionality of the computing device 100 described herein.

In accordance with embodiments, the computing device 100 is configured to set data usage levels among computing devices based on predicted data usage. It is noted that in this example this functionality is described as being implemented by the computing device 100; however, it should be understood that the functionality may be distributed among two or more of the computing devices shown in FIG. 1, another computing device (e.g., a server), or any suitable type or number of computing devices. In this example, the computing device 100 includes a data usage manager 116 residing in memory 112. The data usage manager 116 can be a set of instructions for execution by the processor(s) 114 for implementing functions for setting data usage levels for the computing device 100 and the other computing device(s) 102 with which the computing device 100 share a data usage plan. The data usage plan is administered by service provider 104, which may operate one or more servers and/or other equipment operably connected to the network(s) 106 for providing data communication services. The data usage manager 116 may be configured to predict data usage by the computing device 100. Further, the data usage manager 116 may be configured to set a data usage level of the computing device(s) 102 based on the predicted data usage of the computing device 100. Computing device(s) 102 may also include a data usage manager with the same functionality and functionality for receiving and implementing instructions from the computing device 102 as described in further detail herein.

The data usage manager 116 may maintain and administer plan information 118 residing within memory 112. The plan information 118 may indicate users associated with the data usage plan, information for communicating with computing devices associated with the plan, and an amount of data allocated to each computing device or user in the plan. Table 1 below provides example plan information.

TABLE 1

Example Plan Information

| User | Data Allocation (MB) |
|---|---|
| John | 1000 |
| Nancy | 1000 |
| Zack | 500 |
| Jill | 500 |

Referring to Table 1, in this example the users John and Nancy are parents to children Zack and Jill. John and Nancy are each allocated use of 1000 megabytes (MB) of data in the plan. Zack and Jill are each allocated use of 500 MB of data in the plan. Thus, these users are sharing a total of 3000 MB with a time period of one month. Also, this may be the data amounts normally allocated for use by each user during the month time period. The respective computing devices of each user may inform the user of the total amounts available each month and indicate the amount of allocated data consumed by the user during the month. The user may use this information to plan data usage through the month so that the user can avoid going over an allocated amount of data. The data usage manager 116 may present such information to the user via the user interface 110.

In accordance with embodiments, the data usage manager 116 may adjust or otherwise set data usage among users in a data usage plan based on predicted data usage of one or more computing devices associated with the plan. In the example of Table 1, the data usage manager 116 may adjust the normal allocation of data shown in the table based on predicted data usage during the month time period. For example, the data usage manager 116 may access calendar information within memory 112 that indicates a schedule for John. John's schedule may indicate an upcoming travel event during a particular month. Similar past travel events for John have been associated with an increase in his data usage by about 500 MB. The data usage manager 116 may also check schedules for the other users and determines no deviations from normal. As a result of determining a need for increased data usage by John and no deviations from the others normal usage, the data usage manager 116 may decrease the allocation to each of the other users by the increased amount for John. In this example, the increase of 500 MB by John would be equally or otherwise distributed among the other users. For example, in the month, Nancy's usage may be decreased by 200 MB, and Zack's and Jill's may each be decreased by 100 MB. This way, the data usage manager 116 may assist the users in adjusting their usage based on the predicted change in John's data usage.

Figure 2:
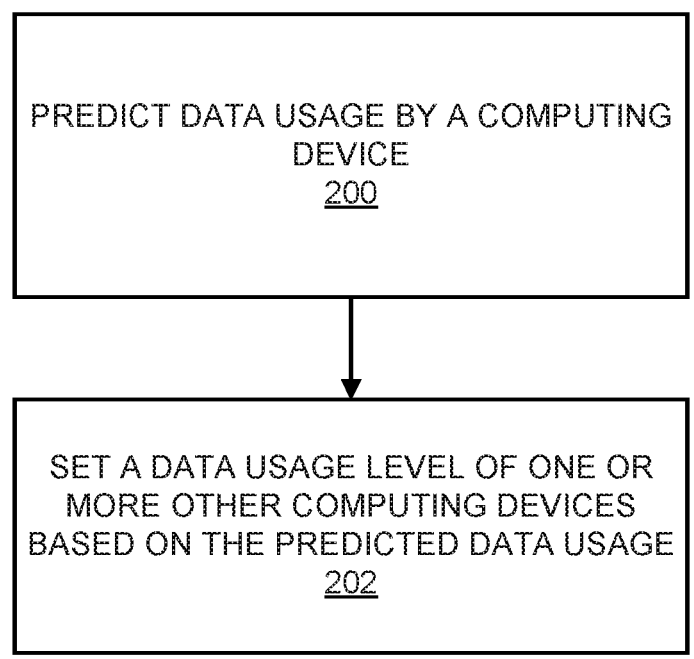
FIG. 2 is a flowchart of a method for setting data usage levels among computing devices based on predicted data usage in accordance with embodiments of the present disclosure.

As an example, FIG. 2 illustrates a flowchart of a method for setting data usage levels among computing devices based on predicted data usage. In this example, the method is described as being implemented by the computing device 100 shown in FIG. 1, although it should be understood that the method may be implemented by any suitable computing device that is part of a data usage plan.

Now referring to FIG. 2, the method includes predicting 200 data usage by a computing device. The computing device may be associated with a data usage plan including the computing device and one or more other computing devices. For example in FIG. 1, the data usage manager 116 of the computing device 100 may predict data usage by the computing device 100. The data usage manager 116 may, for example, predict an amount of time of data communication by the computing device 100 in association with the data usage plan. The data usage manager 116 may predict the time amount based on the user's calendar, various measureable factors, and the like.

As stated, the data usage manager 116 may predict data usage based on a user's calendar. For example, the calendar may reside in memory 112 or be available from another source, such as a remote server. The calendar may indicate events that the user may attend, travel periods, vacations, phone calls, school events, meeting information, and the like. The data usage manager 116 may analyze this calendar information to predict data usage. The prediction may be based on historical data usage when similar or the same calendar events were scheduled. Thus, it can be expected that data usage will be the same during like future time periods. Particularly in implementation, the data usage manager 116 can analyze the calendar to predict a likelihood of data usage by the user using the computing device during a predetermined time period in the future.

In an example, data usage may be predicted based on a meeting indicated in the user's calendar. The meeting may be known to have a high or low density of people. Data usage may be expected to be low at such a meeting when the density is high, because it can be expected that the user will be engaged in conversing with others during the time period. However, if the density is low, it can be expected that data usage may be higher because there are fewer people.

As stated, the data usage manager 116 may predict data usage based on various measureable factors. For example, the memory 112 may store data that indicates health information about the user, messaging content of the user, social media content, news content, media content information, updates scheduled for the computing device, and the like. Such data may be used by the data usage manager 116 for predicting future data usage by the computing device 100. The data usage manager 116 may analyze the data and/or communications by the computing device 100 to predict data usage.

As an example of using the data for predicting data usage, illness or other health information by a user may imply a scenario in which data usage will be higher. For example, an indicator of an illness may imply a work-from-home scenario in which the use of the computing device 100 can be expected to be higher than normal.

In another example of using the data for predicting data usage, messaging content may indicate increased or decreased future data usage. For example, a text message or email received by the user may inform the user of a new television series, game, or movie to enjoy. In this example, such information may increase the likelihood that the user will use the computing device 100 to watch the new television series or movie, or play the game. In that case, the data usage manager 116 can predict increased data usage.

In another example of using the data for predicting data usage, social media or other new events may be used to predict data usage. For example, a user may post on social media frequently. Based on this history, the data usage manager 116 can predict that the user will post on his or her social media account following an important news event on a website.

In another example of using the data for predicting data usage, planned updates for the computing device or the release of new content (e.g., a movie, game, or the like) related to the user's profile can be used to predict data usage. For example, the data usage manager 116 may determine that a new movie is being download, or a software patch or update is being released. In these instances, the data usage manager 116 may predict an increase in data usage, because the computing device 100 can be expected to download such content, thereby increasing data usage from normal.

Returning to FIG. 2, the method includes setting 202 a data usage level of one or more other computing devices based on the predicted data usage. Continuing the aforementioned example, the data usage manager 116 shown in FIG. 1 can set data usage levels of the computing device(s) 102 based on the predicted data usage of computing device 100 during a particular time period. For example, the data usage manager 116 may determine that the use of data may increase by 250 MB during the month of August. In response to this determination, the data usage manager 116 may decrease the data usage allocated to the other computing device(s) 102 by an amount totaling 250 MB. This amount may be distributed equally or otherwise among the other computing devices.

In accordance with embodiments, the data usage manager 116 may determine a normal data usage by the computing device 100. For example, the data usage manager 116 may create and maintain a record of historical data usage of the computing device 100. The record may be stored in the memory 112. The record may indicate data usage each month or any other suitable time period. An average or other suitable measure of data usage may be used for determining a normal data usage by the computing device 100. Alternatively, the normal data usage may be entered by a user or otherwise entered into a record in memory 112. Normal data usage may be determined for each user in a data plan. The data usage manager 116 may adjust data usage levels of other computing device(s) 102 based a predicted deviation from the normal data usage by the computing device 100. In response to determining whether that the predicated data usage is greater than the normal data usage, the data usage level of the other computing device(s) 102 may be increased. In response to determining whether that the predicated data usage is less than the normal data usage, the data usage level of the other computing device(s) 102 may be reduced.

In accordance with embodiments, the data usage manager 116 may control the communication module 108 to suitable notify one or more other computing devices 102 of a set data usage level. For example, when the data usage level for another computing device 102 is changed, the computing device 102 may receive a notification about the change so that the user of the computing device 102 may control his or her data usage habits to remain within the set data usage level. The notification may be presented to the user via a user interface, such as a display.

In accordance with embodiments, a user may override a set data usage level by the data usage manager 116. For example, the data usage manager 116 may indicate a planned change by the user interface 110. The user may review the planned change, and determine to either permit the change, decline the change, or manually change the usage for the other devices.

It is noted that the computing device implemented the functionality described herein may be communicating with any suitable computing device such as, but not limited to, a smartphone, router, laptop computer, desktop computer, or the like.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
predicting data usage by a computing device, wherein the computing device is associated with a data usage plan including the computing device and at least one other computing device;
determining that the predicted data usage of the computing device exceeds a normal usage of the computing device;
determining that a data usage of the at least one other computing device is not deviating from a normal usage of the at least one other computing device;
in response to the determining that the predicted data usage of the computing device exceeds the normal usage of the computing device and that the data usage of the at least one other computing device is not deviating from a normal usage of the at least one other computing device:
  decreasing a data allocation to the at least one other computing device by a first data usage amount; and
  increasing the data allocation to the computing device by a second data usage amount equal to the first data usage amount.

2. The method of claim 1, wherein predicting data usage comprises predicting an amount of time of data communication by the computing device in association with the data usage plan.

3. The method of claim 1, wherein predicting data usage comprises predicting an amount of data communicated by the computing device in association with the data usage plan.

4. The method of claim 1, wherein predicting data usage comprises analyzing a calendar of a user of the computing device to predict a likelihood of data usage by the user using the computing device during a predetermined time period, and
  wherein setting the data usage level comprises setting the data usage level during the predetermined time period.

5. The method of claim 4, wherein predicting data usage comprises analyzing one of events, travel periods, vacations, phone calls, school events, and meeting information indicated on the calendar.

6. The method of claim 1, further comprising analyzing one of data stored on the computing device and communications associated with the computing device, and
  wherein predicting data usage comprises predicting data usage based on the one of data stored on the computing device and communications associated with the computing device.

7. The method of claim 6, wherein the data stored on the computing device includes one of health information about the user, messaging content of the user, social media content, news content, media content information, and updates scheduled for the computing device.

8. The method of claim 1, further comprising:
  determining a normal data usage by the computing device;
  determining whether the predicted data usage is greater than the normal data usage; and
  in response to determining that the predicted data usage is greater than the normal data usage, reducing a data usage level of the at least one other computing device.

9. The method of claim 1, further comprising:
  determining a normal data usage by the computing device;
  determining whether the predicted data usage is less than the normal data usage; and
  in response to determining that the predicted data usage is greater than the normal data usage, increasing a data usage level of the at least one other computing device.

10. The method of claim 1, further comprising communicating, to the at least one other computing device, a notification about the set data usage level.

11. A computing device comprising:
  a data usage manager comprising at least one processor and memory that:
    predicts data usage by a computing device, wherein the computing device is associated with a data usage plan including the computing device and at least one other computing device;
    determines that the predicted data usage of the computing device exceeds a normal usage of the computing device;
    determines that a data usage of the at least one other computing device is not deviating from a normal usage of the at least one other computing device;
    in response to the determining that the predicted data usage of the computing device exceeds the normal usage of the computing device and that the data usage of the at least one other computing device is not deviating from a normal usage of the at least one other computing device:
      decreases a data allocation to the at least one other computing device to the computing device by first data usage amount; and
      increases the data allocation to the computing device by a second data usage amount equal to the first data usage of the at least one other computing device.

12. The computing device of claim 11, wherein the data usage manager predicts, by the processor, an amount of time of data communication by the computing device in association with the data usage plan.

13. The computing device of claim 11, wherein the data usage manager predicts, by the processor, an amount of data communicated by the computing device in association with the data usage plan.

14. The computing device of claim 11, wherein the data usage manager:
  analyzes, by the processor, a calendar of a user of the computing device to predict a likelihood of data usage by the user using the computing device during a predetermined time period, and
  sets, by the processor, the data usage level during the predetermined time period.

15. The computing device of claim 11, wherein the data usage manager:
  analyzes, by the processor, one of data stored on the computing device and communications associated with the computing device; and
  predicts, by the processor, data usage based on the one of data stored on the computing device and communications associated with the computing device.

16. The computing device of claim 11, further comprising:
  determining a normal data usage by the computing device;
  determining whether the predicted data usage is greater than the normal data usage; and
  in response to determining that the predicted data usage is greater than the normal data usage, reducing a data usage level of the at least one other computing device.

17. The computing device of claim 11, further comprising:
  determining a normal data usage by the computing device;
  determining whether the predicted data usage is less than the normal data usage; and
  in response to determining that the predicted data usage is greater than the normal data usage, increasing a data usage level of the at least one other computing device.

18. The computing device of claim 11, wherein the data usage manager communicates, by the processor, to the at least one other computing device, a notification about the set data usage level.

19. The method of claim 1, wherein determining that the data usage of the at least one other computing device is not deviating from the normal usage of the at least one other computing device comprises predicting a data usage of the at least one other computing device.

20. The computing device of claim 11, wherein determining that the data usage of the at least one other computing device is not deviating from the normal usage of the at least one other computing device comprises predicting a data usage of the at least one other computing device.

* * * * *